UNITED STATES PATENT OFFICE.

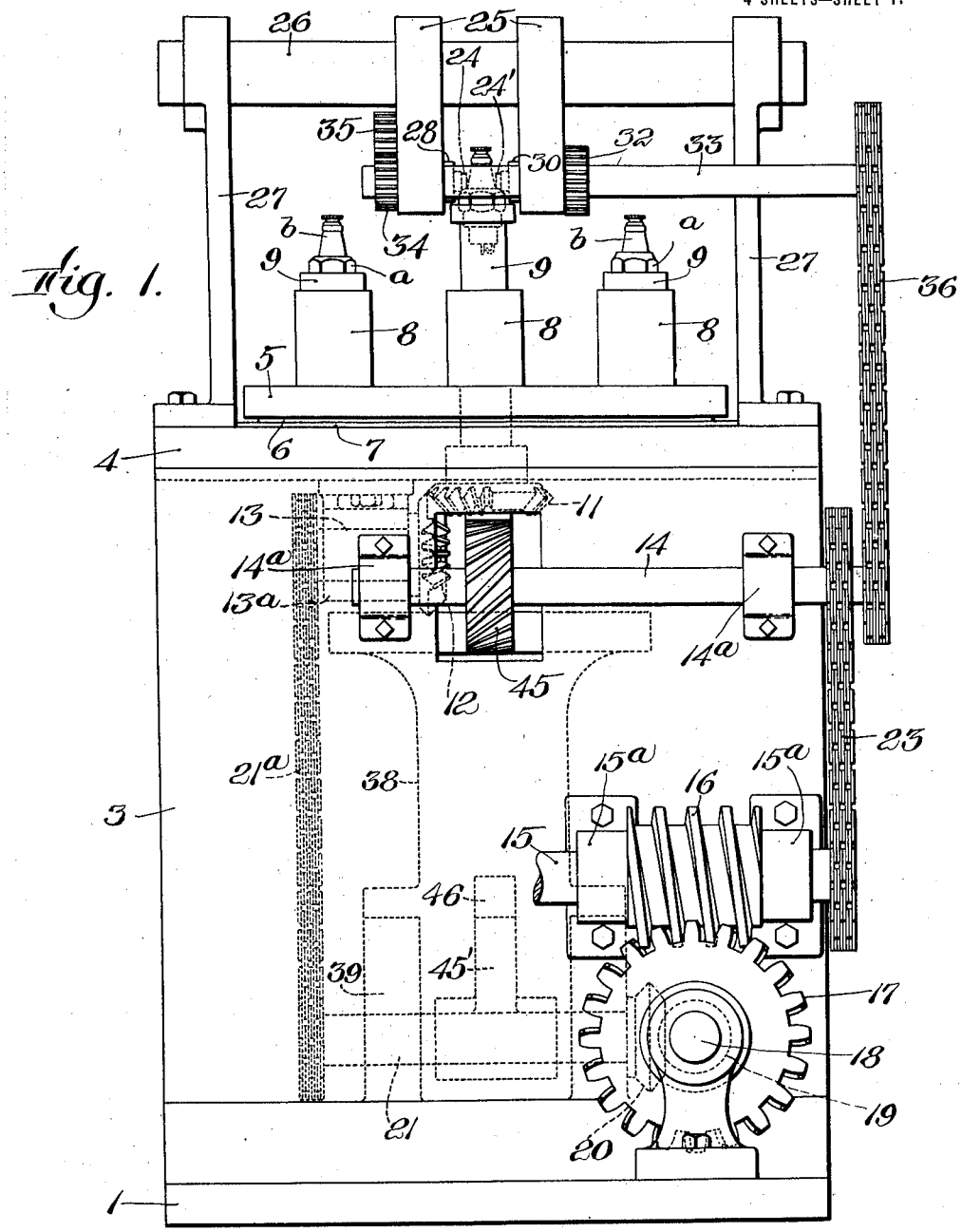

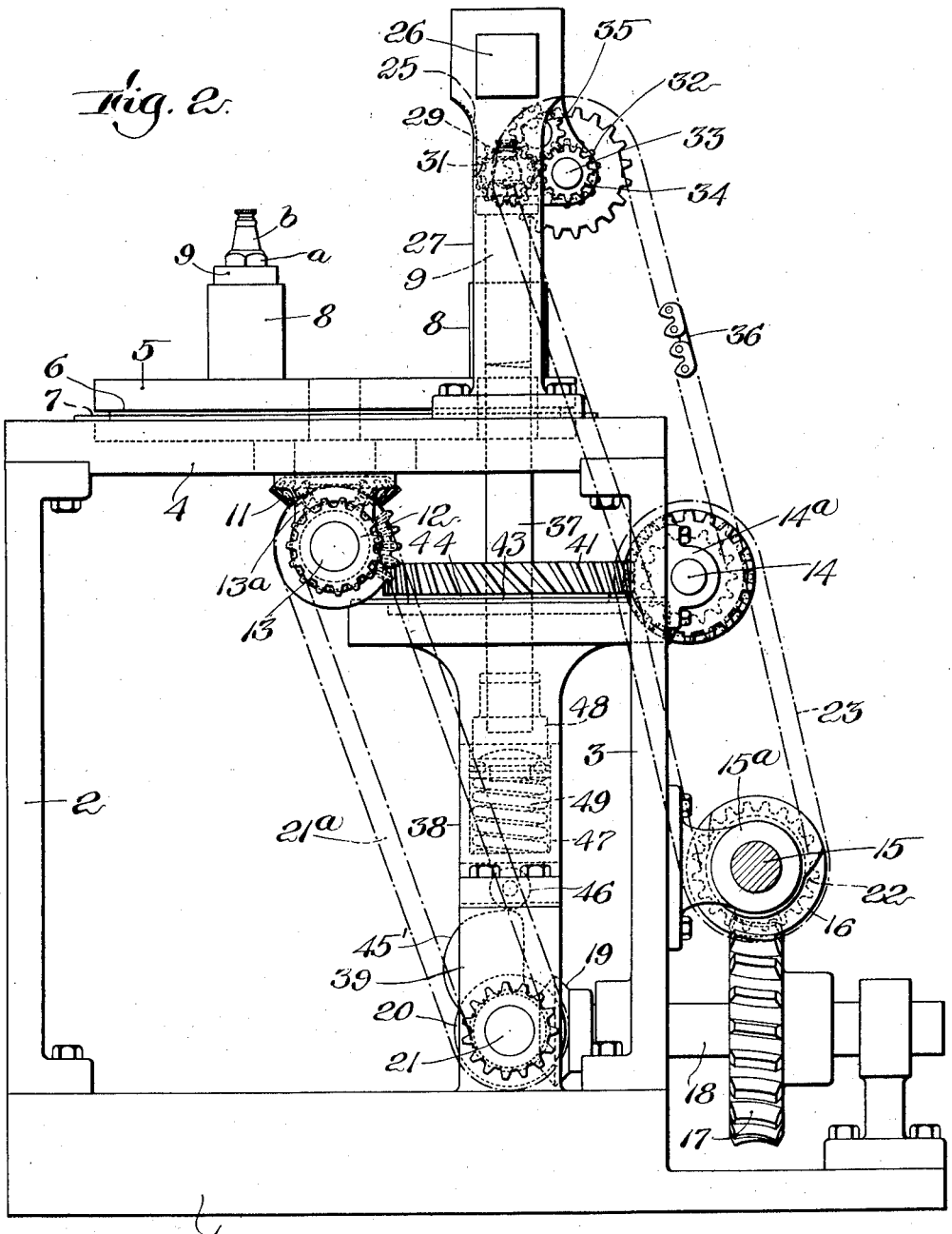

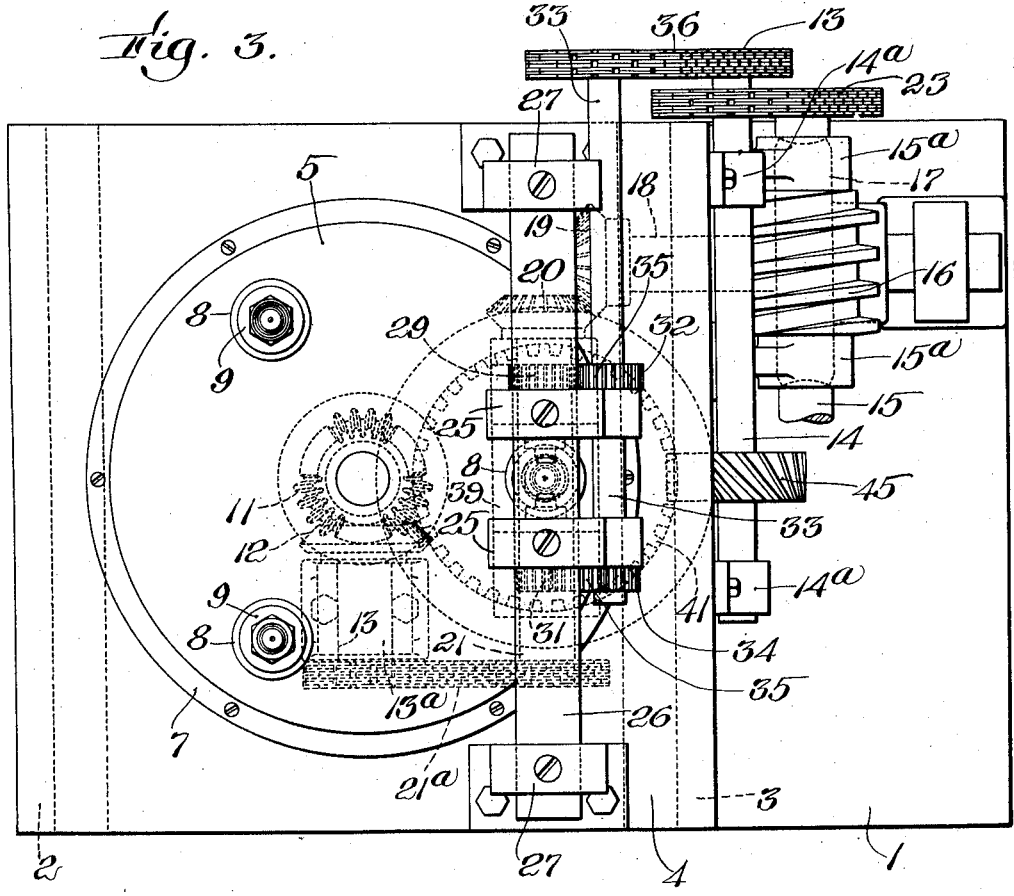
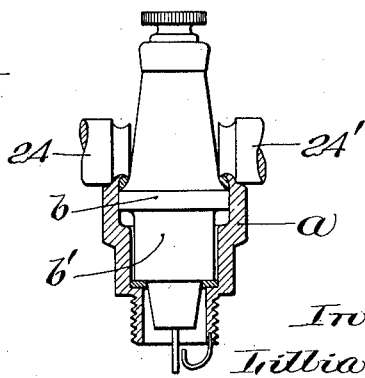

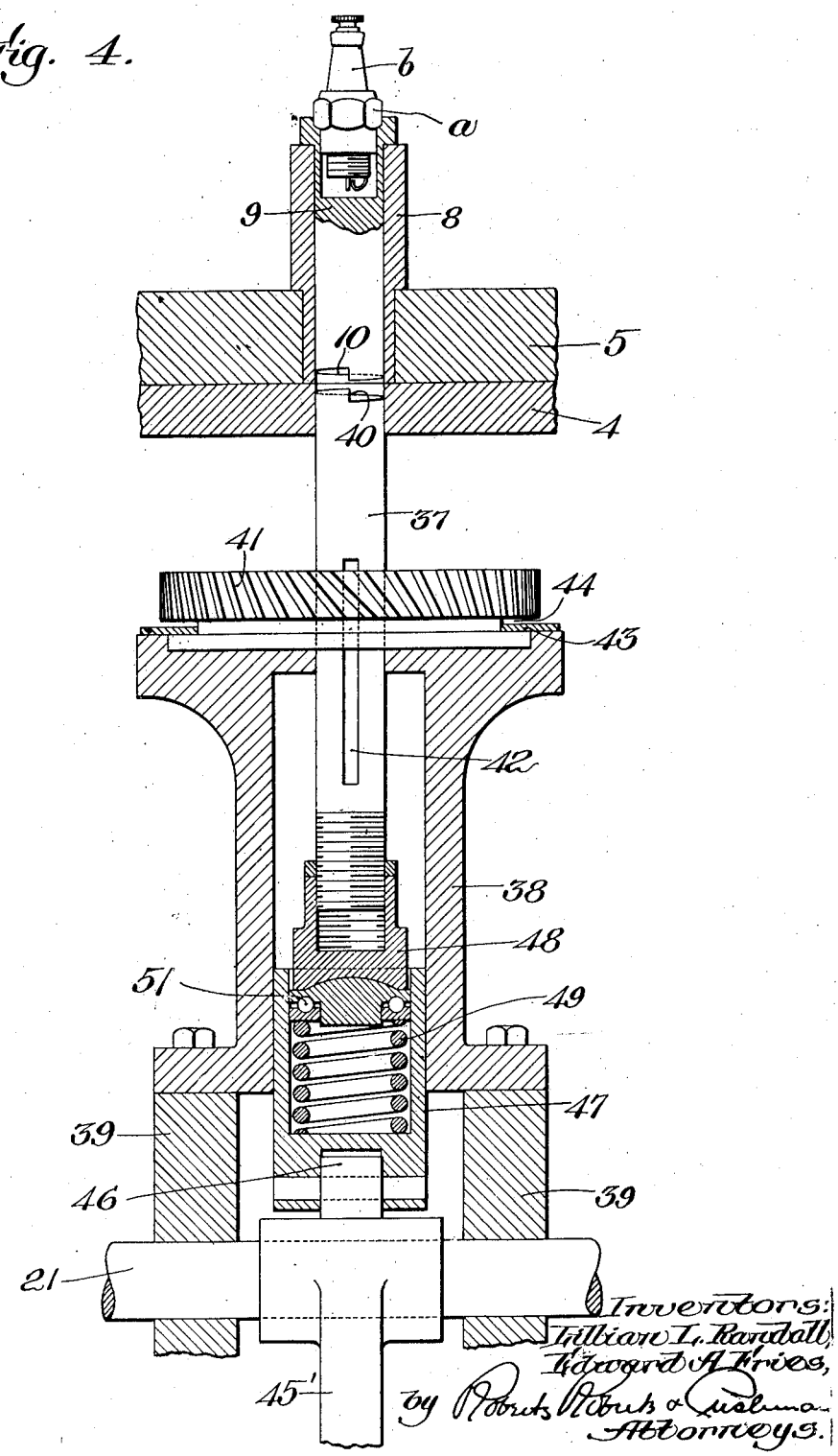

LILLIAN L. RANDALL AND EDWARD A. FRIES, OF BOSTON, MASSACHUSETTS.

JOINT-ASSEMBLING MACHINE.

1,338,697.   Specification of Letters Patent.   Patented May 4, 1920.

Application filed July 31, 1916. Serial No. 112,216.

*To all whom it may concern:*

Be it known that we, LILLIAN L. RANDALL and EDWARD A. FRIES, both citizens of the United States, and residents of Boston, in the county of Suffolk and State of Massachusetts, have invented new and useful Improvements in Joint-Assembling Machines, of which the following is a specification.

This invention relates to a machine for assembling two members of an annular joint. While the invention may be readily adapted for use in forming such joints in various articles, it is particularly designed for assembling the shells and cores of spark plugs of the kind having a porcelain core and a tubular metal shell. The invention will therefore be described as embodied in a machine for assembling spark plugs of the character mentioned, but it is to be understood that this is by way of illustration merely and is not to be construed as limiting the scope of the invention to this particular purpose.

Under present practices the metal shell of a spark plug is joined and sealed to the porcelain core by bending or upsetting the edge of the lip of the shell over the shoulder on the core by means of a press which exerts a direct endwise pressure on the lip of the shell. This results in breaking or cracking a large proportion of the porcelain cores and also fails to insure a gas-tight joint between the shell and the core.

With the present invention the joint is formed by the action of rollers which roll down the edge of the lip of the shell upon the shoulder of the core and form a more perfect and tight joint, without injury to the core, than has been possible to obtain with machines heretofore used. This and other features of the invention will be hereinafter more fully described and particularly pointed out in the claims.

In the accompanying drawings which illustrate one embodiment of the invention in a machine for assembling the joints of spark plugs,—

Figure 1 is a front elevation of the machine;

Fig. 2 is a side elevation of the machine viewed from the left of Fig. 1;

Fig. 3 is a plan view of the machine;

Fig. 4 is a vertical section on an enlarged scale through one of the spindles and the spindle operating and presser mechanism; and Fig. 5 is a detail view, partly in elevation and partly in section, of a spark plug showing the position of the rollers in forming the joint.

The frame of the machine consists of the bed plate or base 1, the upright plates 2 and 3, and the top plate 4, upon which is supported the rotary table 5. The table 5 is set into and bears within a circular depression in the top plate 4, and is provided with an annular groove 6 in its periphery into which projects a ring 7, or other suitable retaining means, screwed or otherwise fastened to the top plate 4 to hold the rotary table 5 in place on its seat in the top of plate 4.

The rotary table 5 carries on its upper side a series of spindle bearings 8, which consist of short tubular members extending through the table. There may be as many such spindle bearings 8 as is found convenient or desirable, three being shown in the drawings spaced 120° apart around the center of the table. In each spindle bearing 8 is a spindle or work holder 9, the upper end of which is hollow and fashioned to form a holder for the spark plug or other article to be operated upon. A clutch member or coupling member 10 is formed on the lower end of the spindle 9. The spindles are mounted to work lengthwise in the spindle bearings 8 and also to turn therein.

The table 5 is intermittently rotated to bring the spindles successively into position under the joint forming rollers hereinafter described, by means of an interrupted miter gear 11 which is fast on a stud fixed to the table 5 and extending downward loosely through the top plate 4. The interrupted gear 11 is actuated by a segmental miter gear 12 on shaft 13 which is journaled in a suitable bracket 13ª secured to the under side of top plate 4. The gear 11 has three gear segments separated by plane surfaces, and the gear 12 has a single gear segment whereby at each revolution of gear 12, which is continuously rotated, the gear 11 will be turned one-third of a revolution, or 120°, corresponding to the angular distance between the spindles 9. Thus each spindle is brought under the joint forming rollers in turn and there remains until the table is again advanced by the completion of another revolution of the segmental gear 12.

The main driving shaft 15 from which the power is transmitted to the various moving parts, is mounted in suitable bearing brackets 15ª secured to the upright plate 3 of the frame. The driving shaft 15 carries a worm 16 which meshes into a worm gear 17 on shaft 18. A miter gear 19 fixed to shaft 18 meshes into a miter gear 20 on shaft 21, and power is transmitted from shaft 21 to gear 12 by means of a sprocket chain 21ª which connects suitable sprocket wheels on shafts 21 and 13.

Shaft 21 also serves as a cam shaft for reciprocating the spindle and presser rod in the manner hereinafter described.

On shaft 15 is a sprocket wheel 22 connected by a sprocket chain 23 to another sprocket wheel on shaft 14, which is mounted in suitable brackets 14ª secured to the upright plate 3 of the frame. The shaft 14 which is continuously rotated from the main driving shaft 15 rotates the spindle presser rod in the manner hereinafter described.

Each spindle 9 is raised in its socket or bearing 8 to bring the work into engagement with the rollers, and is also rotated so as to turn the work under the rollers which roll down the edge of the spark plug shell or other article being operated upon. The rollers 24, 24' are each formed with a groove on the working end to engage and roll down the edge of the shell $a$ of a spark plug or the like, over the shoulder $b$ of the porcelain core $b'$ of the plug (Fig. 5). As herein shown there are two such rollers arranged diametrically opposite each other. Each roller is mounted to turn in a bearing bracket 25 on cross bar 26 which is carried on two supports 27, 27, standing on the top of the machine frame.

The rollers 24, 24' are rotated in opposite directions so as to travel in the same direction on the periphery of the shell $a$ of the spark plug. The roller 24 is secured to a short shaft 28 carrying a gear 29, and the roller 24' is fixed to a short shaft 30 carrying a gear 31. Gear 29 is driven by gear 32 on shaft 33, and gear 31 is driven from shaft 33 through gear 34 fixed to shaft 33 and an intermediate gear 35 meshing with and connecting gears 31 and 34. Shaft 33 is driven by a sprocket chain 36 which connects the sprocket wheels on shafts 33 and 14.

The spindle operating and presser rod 37, best shown in Fig. 4, is vertically mounted in a bearing stand 38 which is securely fixed to blocks 39, 39, cast integrally with the bed plate 1 of the machine frame. The upper end of rod 37 is provided with a clutch or coupler surface 40 to coöperate with clutch 10 of the spindle 9. During the advancement of the rotary table 5 these clutch or coupler elements are disconnected.

The spindle actuating rod 37 is continuously rotated on its axis by worm gear 41 mounted to slide on the rod 37 but connected to turn therewith by a tongue fitted to slide in a groove 42 in the rod. The worm gear 41 is held in place on its bearing seat in the top of stand 38 by means of a flange or similar projection 43, which is secured to the top of stand 38 and extends into the groove 44. The worm gear 41 meshes with worm gear 45 on shaft 14, whereby the presser rod 37 is continuously rotated.

The rod 37 is reciprocated endwise by means of a cam 45' on cam shaft 21. The cam 45' engages a cam roller 46 journaled on the bottom of a spring casing 47 which slides in the bore of stand 38. An adjusting nut or head 48 is threaded on to the lower end of rod 37 and slides inside of the spring casing 47. A compression spring 49 is interposed between the adjusting nut 48 and the bottom of casing 47. The spring 49 whose compression may be regulated by the adjusting nut 48 exerts an even pressure on the work and takes care of any variation in pressure which might otherwise result from variations in the dimensions of the spark plug members. The rod 37 is permitted to rotate freely, notwithstanding the endwise pressure on the spring casing, by means of a ball bearing 51 between the nut or head 48 and the top of the spring 49.

In operation the two members of a spark plug on which the joint is to be formed are placed together in one of the spindles 9 as shown in Fig. 4. The table 5 is rotated intermittently as already explained to bring the spindles successively under the rollers 24, 24'. While the table is turning presser rod 37 is in its lowermost position, as shown in Fig. 4, thereby disconnecting the rod 37 from the spindle 9. When the table comes to rest with one of the spindles and the spark plug members carried thereby underneath the rollers 24, 24', the cam 45' is timed to engage the spring casing on the lower end of the rod 37 and push the rod 37 upward. The first part of the upward movement of rod 37 connects the clutch members 10 and 40 and the remainder of the movement of rod 37, which is continuously rotating, both pushes the spindle upward to the end of its stroke and rotates the same with the lip of the spark plug casing $a$ pressed into engagement with the rotating rollers 24, 24'. These rollers are revolving in the opposite direction one to the other, but in the same direction as the rotating spark plug, so that the rollers exert a rolling pressure contact on the lip of the shell $a$ turning the same over upon the shoulder $b$ in the manner best illustrated in Fig. 5. The rotation of the presser rod 37 and of the rollers 24, 24', is so timed that the peripheries or circumferences of the rollers and of the lip of the shell a will travel at the same speed thereby insuring only a rolling contact without any rubbing or sliding between the rollers and the work. As the rollers 24 and 24' are diametrically opposite each other the pressure exerted on the shell of the spark plug will be equal on both sides of its axis.

The spring 49 is so regulated as to exert the desired pressure between the work and the rolls, and will yield in case of any excess of pressure which might otherwise endanger the breaking of the spark plug 4. After a predetermined number of revolutions of the work under the rollers 24, 24', sufficient for forming a tight seal between the annular lip of the shell a and the shoulder b of the core, the cam 45 will again move downward, dropping the spindle and the finished plug to its lower position and disconnecting the rod 37 from the spindle, whereupon the intermittently actuated table will rotate the table the next step to bring the next spindle into position for operation in the same manner as just described. The entire action of the machine is automatic and all the operator has to do is to remove the finished spark plug from its spindle and insert the two members of the disconnected spark plug in position to be acted upon when the spindle is again brought under the rollers.

We claim:

1. A machine of the character described comprising a work holder, rollers adapted to upset a lip on the article being operated upon, means to move the work holder toward and away from the rollers, and means to rotate the work holder relatively to the rollers.

2. A machine of the character described comprising a work holder, rollers adapted to upset a lip on the article being operated upon, means positively to rotate said rollers on their axes, means to move the work holder toward and away from the rollers, and means to rotate the work holder relatively to the rollers.

3. A machine of the character described comprising a work holder, rollers adapted to upset a lip on the article being operated upon, means to impart relative motion of reciprocation between the work holder and the rollers toward and from each other, means to impart a relative motion of revolution between the rollers and the work holder, and means positively to rotate said rollers on their axes in the same direction as the relative motion of revolution of the work holder, and at the same surface speed as the work in said work holder.

4. A machine of the character described comprising a work holder, rollers adapted to upset a lip on the article being operated upon, means to move the work holder toward and away from the rollers, means to rotate the work holder relatively to the rollers, and means positively to rotate said rollers on their axes in the same direction as the work holder and at the same surface speed as the work in the work holder.

5. A machine of the character described comprising a work holder, rollers adapted to upset a lip on the article being operated upon, means to impart relative motion of reciprocation between the work holder and the rollers toward and from each other, means to impart a relative motion of revolution between the rollers and the work holder, and means to exert yielding pressure upon the work between the work holder and the rollers.

6. A machine of the character described comprising a work holder, rollers adapted to upset a lip on the article being operated upon, means to move the work holder toward and away from the rollers, means to impart relative motion of revolution between the rollers and the work holder, and means acting on the work holder to press the work into yielding engagement with the rollers.

7. A machine of the character described comprising a work holder, rollers adapted to upset a lip on the article being operated upon, means to impart relative motion of reciprocation between the work holder and the rollers toward and from each other, means to impart a relative motion of revolution between the rollers and the work holder, means to exert yielding pressure upon the work between the work holder and the rollers, and means to adjust said pressure.

8. A machine of the character described comprising a work holder, rollers adapted to upset a lip on the article being operated upon, means to move the work holder toward and away from the rollers, means to impart relative motion of revolution between the rollers and the work holder, and adjustable means acting on the work holder to press the work into yielding engagement with the rollers.

9. A machine of the character described comprising a work holder, rollers adapted to upset a lip on the article being operated upon, means to move the work holder toward and away from the rollers, and means to rotate the work holder relatively to the rollers, a spring acting on the rotatable work holder to press the work into yielding engagement with the rollers, and an antifriction bearing interposed between the spring and the work holder.

10. A machine of the character described comprising a rotatable work holder, rollers adapted to upset a lip on the article being operated upon, a work holder actuating member, a separable coupling between said member and the work holder, means continuously to rotate said member, and means to connect and disconnect said coupling.

11. A machine of the character described comprising a rotatable work holder, rollers adapted to upset a lip on the article being operated upon, a work holder actuating member, a separable coupling between said member and the work holder, means continuously to rotate said member, and means to shift said actuating member axially to engage and disengage said coupling.

12. A machine of the character described comprising a spindle mounted both to rotate and to move endwise, rollers adapted to upset a lip on the article held by said spindle, a spindle rotating and presser rod, a separable coupling between said rod and spindle, means continuously to rotate said rod, and means to shift said rod endwise to engage and disengage said coupling and to press said spindle toward said rollers.

13. A machine of the character described comprising a spindle mounted both to rotate and to move endwise, rollers adapted to upset a lip on the article held by said spindle, a spindle rotating and presser rod, a separable coupling between said rod and spindle, means continuously to rotate said rod, means to shift said rod endwise to engage and disengage said coupling and to press said spindle toward said rollers, and a spring interposed between said endwise shifting means and said rod.

14. A machine of the character described, comprising a movable table, a series of work holders on said table, rollers adapted to upset a lip on the article held by said work holders, means to move the table intermittently to bring said work holders successively into working position relative to said rollers, and a single actuating member by which the work holders are successively operated when in working position.

15. A machine of the character described, comprising a movable table, a series of work holders on said table, rollers adapted to upset a lip on the article held by said work holders, means to move the table intermittently to bring said work holders successively into working position relative to said rollers, and a single actuating member adapted to press the work holder which is in working position toward the rollers.

16. A machine of the character described, comprising a movable table, a series of work holders on said table, rollers adapted to upset a lip on the article held by said work holders, means to move the table intermittently to bring said work holders successively into working position relative to said rollers, a single actuating member adapted to press the work holder which is in working position toward the rollers, means to shift said actuating member, and a spring between said means and the actuating member.

17. A machine of the character described, comprising a movable table, a series of spindles mounted both to move endwise and to rotate on the table, rollers adapted to upset a lip on the article held by the spindles, means to move the table intermittently to bring the spindles successively into working position relative to said rollers, a single actuating member adapted while the table is at rest both to rotate the spindle which is in working position and to press the same toward the rollers.

18. A machine of the character described, comprising a movable table, a series of spindles mounted both to move endwise and to rotate on the table, rollers adapted to upset a lip on the article held by the spindles, means to move the table intermittently to bring the spindles successively into working position relative to said rollers, a single spindle actuating member, a separable coupling between said member and the spindles, means continuously to rotate said member, and means to shift said member endwise to engage and disengage said coupling and to press the spindle which is in working position toward the rollers while the table is at rest.

19. A machine of the character described, comprising a plurality of work holders, rollers adapted to upset a lip on the articles held by said work holders, means to carry said work holders one after another into working position relative to said rollers, means to impart a relative motion of reciprocation between the holder in working position and the rollers, and means to impart a relative motion of revolution between the holder in working position and the rollers.

20. A machine of the character described, comprising a plurality of work holders, rollers adapted to upset a lip on the articles held by said work holders, means to carry said work holders one after another into working position relative to said rollers, means to move each work holder while in working position toward and away from the rollers, and means to impart a relative motion of revolution between the holder in working position and the rollers.

21. A machine of the character described, comprising a plurality of work holders, rollers adapted to upset a lip on the articles held by said work holders, means to carry said work holders one after another into working position relative to said rollers, and a single actuating member by which the work holders are successively operated when in working position.

22. A machine of the character described, comprising a work holder, a pair of rollers arranged diametrically opposite each other with relation to the axis of the work holder whereby the pressure exerted on the work by the rollers will be balanced, said rollers being adapted to upset a lip on the article being operated upon, means to impart a relative motion of reciprocation between the work holder and the rollers, and means to impart a relative motion of revolution between the work holder and the rollers.

23. A machine of the character described, comprising a work holder, a plurality of rollers symmetrically arranged with relation to the axis of the work holder whereby the pressure exerted on the work by the rollers will be balanced, said rollers being adapted to upset a lip on the article being operated upon, means to impart a relative motion of reciprocation between the work holder and the rollers, and means to impart a relative motion of revolution between the work holder and the rollers.

Signed by us at Boston, Massachusetts, this 26th day of July, 1916.

LILLIAN L. RANDALL.
EDWARD A. FRIES.